United States Patent
Jones et al.

(10) Patent No.: US 10,354,222 B2
(45) Date of Patent: Jul. 16, 2019

(54) PRODUCT TRACKING SYSTEM

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron James Vasgaard, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 17 days.

(21) Appl. No.: 15/849,786

(22) Filed: Dec. 21, 2017

(65) Prior Publication Data
US 2018/0181908 A1 Jun. 28, 2018

Related U.S. Application Data

(60) Provisional application No. 62/439,571, filed on Dec. 28, 2016.

(51) Int. Cl.
*G01F 1/90* (2006.01)
*G06K 7/10* (2006.01)
(Continued)

(52) U.S. Cl.
CPC .............. *G06Q 10/087* (2013.01); *G01F 1/90* (2013.01); *G06K 7/10366* (2013.01); *G06K 19/07749* (2013.01); *G06Q 20/203* (2013.01)

(58) Field of Classification Search
CPC ...... A45C 13/18; G06Q 10/087; G06Q 10/06; G06Q 20/203; G06Q 30/00; G08B 13/08;
(Continued)

(56) References Cited

U.S. PATENT DOCUMENTS

| | | |
|---|---|---|
| 3,426,326 A | 2/1969 | Goldstein |
| 3,725,895 A | 4/1973 | Haynes |

(Continued)

FOREIGN PATENT DOCUMENTS

WO 2014102797 A1 7/2014

*Primary Examiner* — Sonji N Johnson
(74) *Attorney, Agent, or Firm* — Schmeiser, Olsen & Watts LLP; Timothy P. Collins

(57) ABSTRACT

Systems, methods and tools for tracking the amounts of merchandise being displayed or available for sale in a retail environment using measurements of air displacement caused by the movement of customers, employees and shopping carts throughout a retail environment. The disclosed embodiments may position air displacement sensors throughout a store and near the products being offered for sale. As the merchandise is removed by customers, a greater amount of air may be measured. Embodiments of each sensor device may be calibrated with a maximum threshold measurement of air displacement corresponding to the amount of merchandise surrounding the sensor. After enough of the products have been removed from the surrounding proximity of the sensor, the maximum threshold of air displacement may be reached, wherein upon exceeding the maximum threshold of air displacement a signal may be sent alerting employees to restock the specified merchandise proximate to the sensor's location.

20 Claims, 6 Drawing Sheets

(51) Int. Cl.
*G06Q 10/08* (2012.01)
*G06Q 20/20* (2012.01)
*G06K 19/077* (2006.01)

(58) Field of Classification Search
CPC .. G08B 13/126; G08B 13/14; G08B 21/0263; G08B 21/0266; G08B 21/0269; G08B 21/0272; G08B 21/0275; G08B 21/0277; G06K 19/07749; G06K 7/10366; G01F 1/90; G01F 1/34; G01F 23/01; G05B 23/0216
See application file for complete search history.

(56) References Cited

U.S. PATENT DOCUMENTS

| | | |
|---|---|---|
| 7,908,237 B2 | 3/2011 | Angell et al. |
| 8,860,579 B1 | 10/2014 | Alouani et al. |
| 2003/0125836 A1 | 7/2003 | Chirnomas |
| 2007/0273513 A1 | 11/2007 | White |
| 2015/0041616 A1 | 2/2015 | Gentile et al. |
| 2015/0206188 A1* | 7/2015 | Tanigawa ........... G06Q 30/0261 705/14.58 |
| 2016/0048798 A1* | 2/2016 | Meyer ................. G06Q 10/087 705/28 |

* cited by examiner

PRODUCT TRACKING SYSTEM

CROSS REFERENCE TO RELATED APPLICATIONS

This application claims priority and benefit of U.S. Patent Application No. 62/439,571 entitled PRODUCT TRACKING SYSTEM, filed on Dec. 28, 2016, the contents of which are hereby incorporated by reference.

TECHNICAL FIELD

The present disclosure relates generally to systems and methods for monitoring the product levels and availability of merchandise.

BACKGROUND

When operating a retail store or other establishment that offers products for sale, it is important to regularly restock merchandise being displayed on the shelves, end caps and organized displays. Ideally, restocking is effected before or immediately upon exhaustion of the product being displayed. Since product turnover equates to profit in most retail establishments, the ability to constantly monitor on-shelf inventory, product availability and data indicative of sales or even theft can be important. It is further desirable that such systems include the ability to alert the retail store management and employees with regard to out of stock situations, low inventory or even unusual activity, to allow for corrective action as soon as possible. The ability to monitor sales activities on the basis of day of the week and time of day is recognized as an important capability allowing for enhanced sales activities.

SUMMARY

A first embodiment of the present disclosure provides a method for tracking merchandise comprising the steps of placing a sensor device into a proximity near merchandise being displayed; measuring, by the sensor device, a displacement of air in a presence of the merchandise; calibrating the sensor device to a baseline measurement equal to the displacement of air measured during the measuring step; establishing, by the sensor device, a threshold for a permissible change in the baseline measurement of the displacement of air; detecting, by the sensor device, a change in the displacement of air that is greater than the threshold, wherein the change in the displacement of air occurs as a function of a removal of the merchandise from the proximity of the sensor device; and transmitting, by the sensor device, an alert indicating a removal of the merchandise from the proximity of the sensor device.

A second embodiment of the present disclosure provides a computer system comprising a processor; a memory device coupled to the processor; a sensor device coupled to the processor; and a computer readable storage device coupled to the processor, wherein the computer readable storage device contains program code executable by the processor via the memory device to implement a method for tracking merchandise comprising the steps of: placing the sensor device into a proximity near merchandise being displayed; measuring, by the sensor device, a displacement of air in a presence of the merchandise; calibrating the sensor device to a baseline measurement equal to the displacement of air measured during the measuring step; establishing, by the sensor device, a threshold for a permissible change in the baseline measurement of the displacement of air; detecting, by the sensor device, a change in the displacement of air that is greater than the threshold, wherein the change in the displacement of air occurs as a function of a removal of the merchandise from the proximity of the sensor device; and transmitting, by the sensor device, an alert indicating a removal of the merchandise from the proximity of the sensor device.

DETAILED DESCRIPTION

Figure 1:
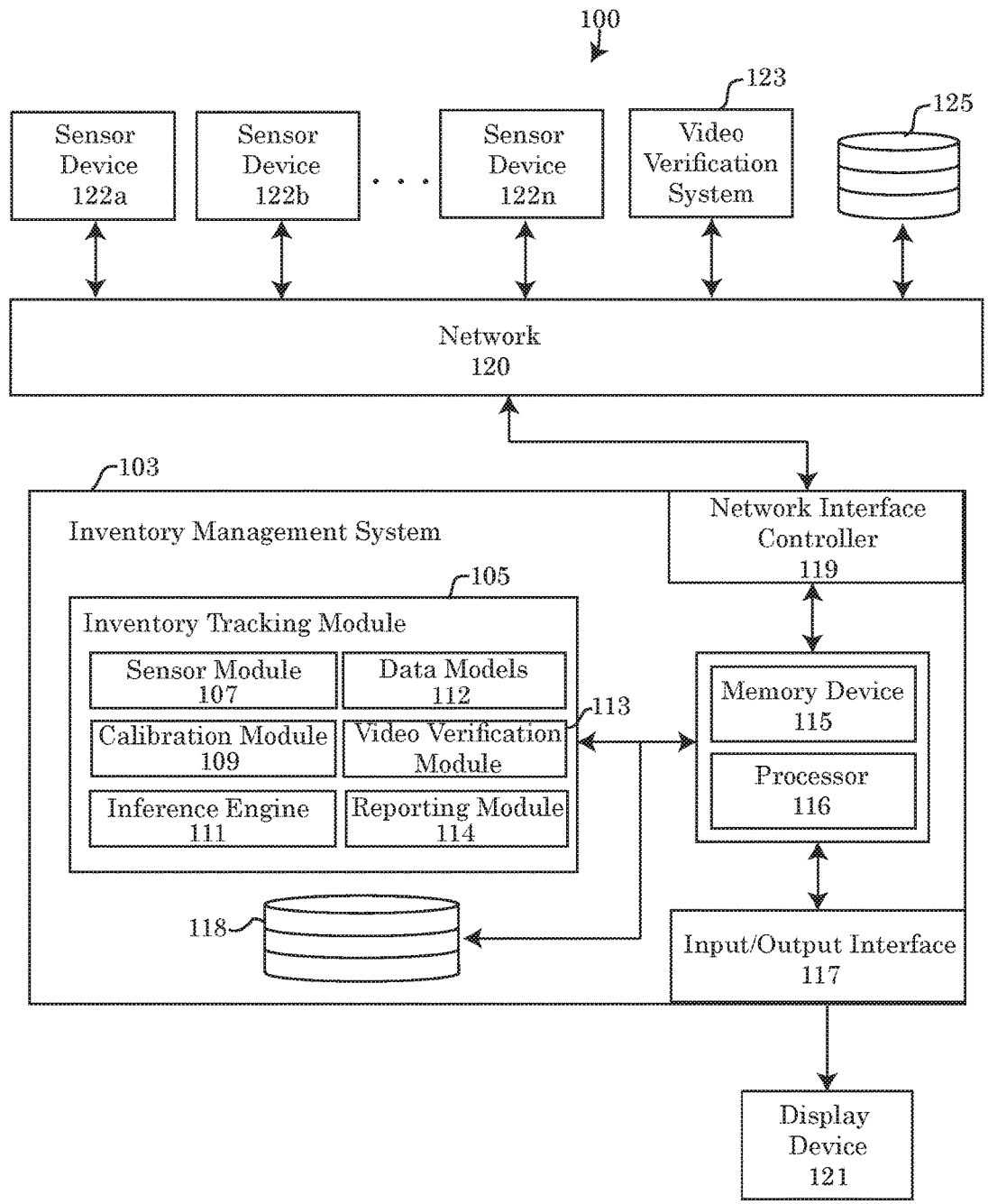
FIG. 1 depicts a block diagram of an embodiment of a system for tracking merchandise.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Inventory management systems and retail product displays often rely on employee based tracking mechanisms and reporting to effectively maintain an adequate amount of merchandise on display for customers to view, select and purchase. Often, retail stores assign employees to one or more departments where each employee may assist customers in the assigned department as well as visually monitor and observe the levels of product stocked in the department. In instances where the employee observes an inadequate amounts of merchandise or even empty sections of a product display, the employee may request or schedule products to be restocked. In some retail stores, the employee may undertake the role of restocking the shelves or product displays personally.

Embodiments of present disclosure improve upon currently available systems and methods for tracking the amounts of merchandise being displayed or available for sale in a retail environment. Instead of having an employee visually monitoring store shelves, standalone displays and end caps, embodiments of the present disclosure may utilize sensors to monitor the product levels. More specifically, embodiments of the present disclosure may measure the displacement of air, caused by the movement of customers and shopping carts throughout the store to determine when the amount of products being displayed are in low-supply or completely absent from the displays.

In some embodiments of the present disclosure, the monitoring system may position air displacement sensors throughout a store and near the products being offered for sale. Each of the sensors may be connected through a wired or wireless connection to a computer system that may be responsible for monitoring the sensor activity and receive measurements from the sensor describing the displacement of air as a function of the amount of merchandise currently stocked. Embodiments of the air displacement sensors may monitor the displacement of air around a specified region or product display. In some embodiments, each sensor may be assigned by the computer system, a unique identifier allowing for the computer system to correlate measurements taken by the specified sensor to a particular region of the store or products assigned to the sensor device.

As customers walk through the store, select products and remove the products from the shelves or displays, changes in air displacement may occur. For instance, a sensor measuring air displacement may detect a lower displacement of air in the presence of several products on a shelf limiting the air's displacement as opposed to an empty shelf that does not have any barriers formed by the products that would limit the air displacement. As the products are removed, a greater amount of air may be displaced as customers move through the store past the shelves and displays equipped with the sensors. Embodiments of each sensor may be calibrated with a maximum threshold measurement of air displacement corresponding to the amount of merchandise surrounding the sensor. After enough of the products have been removed from the surrounding proximity of the sensor, the maximum threshold of air displacement may be reached, wherein upon exceeding the maximum threshold of air displacement a signal may be sent to the computer system monitoring each of the sensor devices.

In some embodiments, the receipt of a signal from the sensor may indicate to the computer system to request an employee restock the merchandise at the particular location of the sensor. The computer system may log each location of the sensors connected to the computer system and the corresponding merchandise or products tracked by the sensor at the particular location. By tracking the types of products associated with each sensor, the employee receiving a request from the computer system, may further describe the merchandise that should be restocked at the specified location of the sensor. Moreover, the computer system may track and log the products being restocked, the timings of the restocking, the most popular locations receiving restocking requests and draw conclusions about the most popular products, busiest times of operation for the store and the most popular areas for displaying products to customers.

In some embodiments of the merchandise monitoring system, the system may further include a video verification system. The video verification system may include cameras positioned throughout the store. The computer system, users and administrators thereof may verify the signals received from the sensor devices placed throughout the store in order to confirm that the sensors reporting a change in air displacement above the maximum threshold are accurately detecting depleted or low amounts of merchandise being displayed at the particular sensor's location. Subsequently, upon viewing the merchandise levels at the sensor's location via the verification system, the computer system and/or administrator of the computer system may confirm, alter or cancel restocking requests. The confirmations, alterations or cancellations of the request, even before any employee is dispatched to the location of the sensor. The automation of the restocking system may improve the overall efficiency of employee restocking for the store and reduce the amount of employees needed to constantly monitor merchandise levels, consequently freeing up an employee's time to perform additional tasks throughout the store.

System for Tracking Merchandise

Referring to the drawings, FIG. 1 illustrates a schematic diagram of a system 100, for tracking merchandise, consistent with the disclosure of this application. Embodiments of system 100 may comprise one or more specialized computer systems 103, 123 having specialized configurations of hardware, software or a combination thereof as depicted in FIGS. 1-4 and as described throughout the present disclosure. Embodiments of each computer systems 103, 123 may further comprise one or more elements of the generic computer system 600 of FIG. 6, described in detail below. The elements of the generic computer system 600 may be integrated into each of the specialized computer systems 103, 123 described herein.

Embodiments of the system 100 for tracking merchandise may comprise an inventory management system 103. The inventory management system 103 may be a specialized computer system which may include a processor 116 and specialized hardware and/or software loaded in the memory device 115 of the inventory management system 103. The embodiments of the inventory management system 103 may perform the functions, tasks and routines relating to the calibration of one or more sensor devices 122a, 122b . . . 122n (referred to individual or collectively as "sensor device 122"), assigning identification numbers, locations and products to the sensor device for monitoring, receiving sensor data from the sensor device 122, interpreting the sensor data and drawing inferences about the sensor data regarding the levels of merchandise being displayed, transmitting restocking requests or messages to one or more employees and verifying the amount of merchandise currently displayed for purchase. Embodiments of the specialized hardware and/or software of the inventory management system 103 may be part of an inventory tracking module 105. The hardware and software components of the tracking module 105 may include a sensor module 107, calibration module 109, inference engine 111, data models 112, video verification module 113 and reporting module 114. As used herein, the term "module" may refer to a hardware module, software-based module or a module may be a combination of hardware and software resources of the inventory management system 103 and/or resources remotely accessible to the inventory management system 103.

Embodiments of the modules described in this application, whether comprising hardware, software or a combination of resources thereof, may be designed to implement or execute one or more particular functions, tasks or routines of the inventory management system 105 incorporated therein. Embodiments of hardware-based modules may include self-contained components such as chipsets, specialized circuitry and one or more memory devices comprising a memory storage medium (described below). A software-based module may be part of a program code or linked to program code or computer code 697, 698 containing specific programmed instructions loaded into the memory device 215 of the respective computer system, such as the inventory management system 103, and/or a remotely accessible memory device (not shown) of a network accessible computer system. For example, in some embodiments the network accessible computer system may be a web server, application server, a centralized management system for the network 120 of computer systems or a video verification system 123.

In some embodiments of the inventory management system 103, the inventory tracking module may include one or more sub-modules that may be assigned to perform one or more particular tasks and functions of the inventory management system 103. The types and number of sub-modules may vary from embodiment to embodiment depending on the components and arrangement of components featured in the inventory management system 100, 200. However, in the exemplary embodiments shown in FIGS. 1-2, the inventory tracking module 105 may comprise a sensor module 107, calibration module 109, inference engine 111, data models 112, video verification module 113 and reporting module 114.

Figure 2:
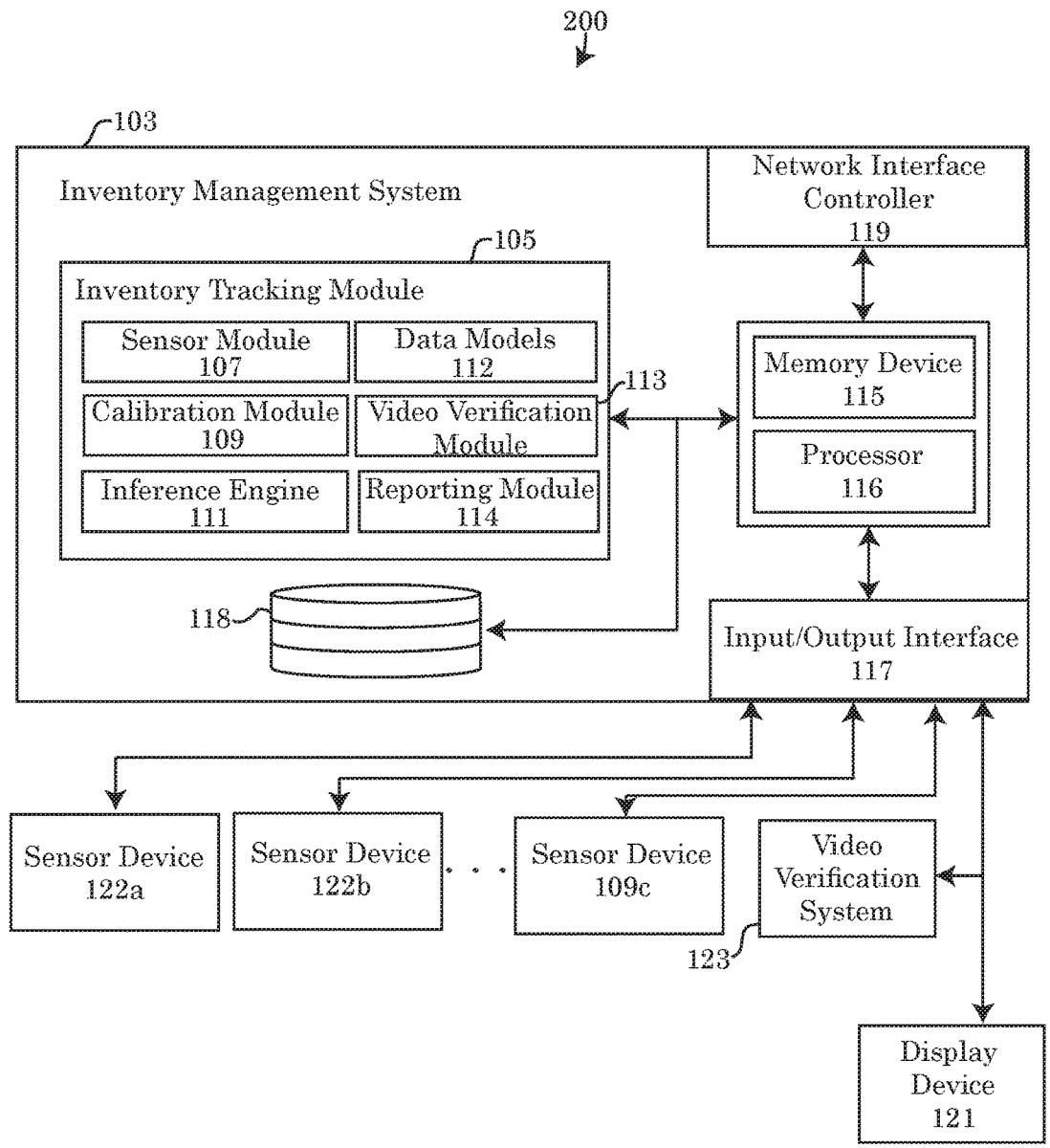
FIG. 2 depicts a block diagram of an alternative embodiment of a system for tracking merchandise.

Embodiments of the sensor module 107 may send, receive and process sensor data collected by each sensor device 122 connected to the inventory management system 103. The sensor module 107 may interpret physical signals received from each sensor device 122 that may be measuring the displacement of air in the proximate location of the sensor's position. Elements depicted in the figures described herein, having reference numbers including sub-letters and ellipses, for example sensor devices 122a, 122b . . . 122n, may signify that the embodiments comprising the element are not limited only to the amount of elements actually shown in the drawings, but rather, the ellipses between the reference number and the $n^{th}$ iteration of the element indicate a variable number of similar elements of a similar type that may be present. For instance, in FIG. 3, twenty-eight different sensor devices are symbolically represented in the drawing, including a number of specifically referenced sensor devices 122a-122h. The inclusion of the plurality of sensor devices 122 beyond three depicted in FIG. 1-2 demonstrates that the number of sensor devices 122 represented in the block diagrams of FIGS. 1-2 are not solely limited to the three sensor devices. Rather a plurality of sensor devices may be positioned throughout a location or environment.

Embodiments of the sensor module 107 may collect and store the sensor data received from each sensor device 122 in one or more data repositories 118 or network accessible data repositories 125 for further processing at a later time. In some embodiments, the sensor module 107 may assign a unique identification number or alpha numeric code to each of the sensor devices connected to the inventory management system 103. In some embodiments, the unique identification number assigned to each sensor may be an IP address or MAC address. Moreover, in some embodiments, the sensor module 107 may collect, store and assign location or product data associated with each sensor device 122. For example, the sensor module may collect and save information or data describing the position of the of the sensor device 122 within a store and the types of products placed within the proximity of each sensor device 122. The location information of each product affiliated with the sensor device 122 may be catalogued or stored by the sensor module 122 in one or more data repositories 118, 125. For example, the identification number, location and product information may be stored as a database entry for each sensor device. The information stored by the affiliated database may be queried, retrieved and displayed by the inventory management system 103.

In some embodiments of the inventory management system 103 and the sensor module 107 may communicate over a computer network 120. Communication with the inventory management system 103 may occur using either wired or wireless signals between the inventory management system's 103 network interface controller (NIC) 119 and the NIC or receiver/transceiver antenna of the sensor device 122. As shown in the exemplary embodiment of FIG. 1, each computer system 103, 122, 123 and components 125 may connect to the network 120 and communicate over the network 120 using the NIC 119 or other network communication hardware. Embodiments of the NICs 119 may implement specialized electronic circuitry allowing for communication using a specific physical layer and a data link layer standard such as Ethernet, Fiber channel, Wi-Fi or Token Ring. The NIC 119, may further allow for a full network protocol stack, enabling communication over network 120 to the group of computer systems or other computing hardware devices linked together through communication channels. The network 120 may facilitate communication and resource sharing among the computer systems 103, 122, 223 and additional hardware devices connected to the network 120, for example a network repository 125. Examples of a network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some alternative embodiments, a physical connection between the sensor devices 122 and the inventory management system 103 may be established via the input/output (I/O) interface 117, as shown in FIG. 2. The I/O interface 117 may refer to any communication process performed between the power management system and the environment outside of the power management system, for example, the sensor devices 107. The input data, such as the sensor data transmitted to the inventory management system via the I/O interface 117 may be stored in a computer readable memory device or medium such as memory device 115.

Figure 3:
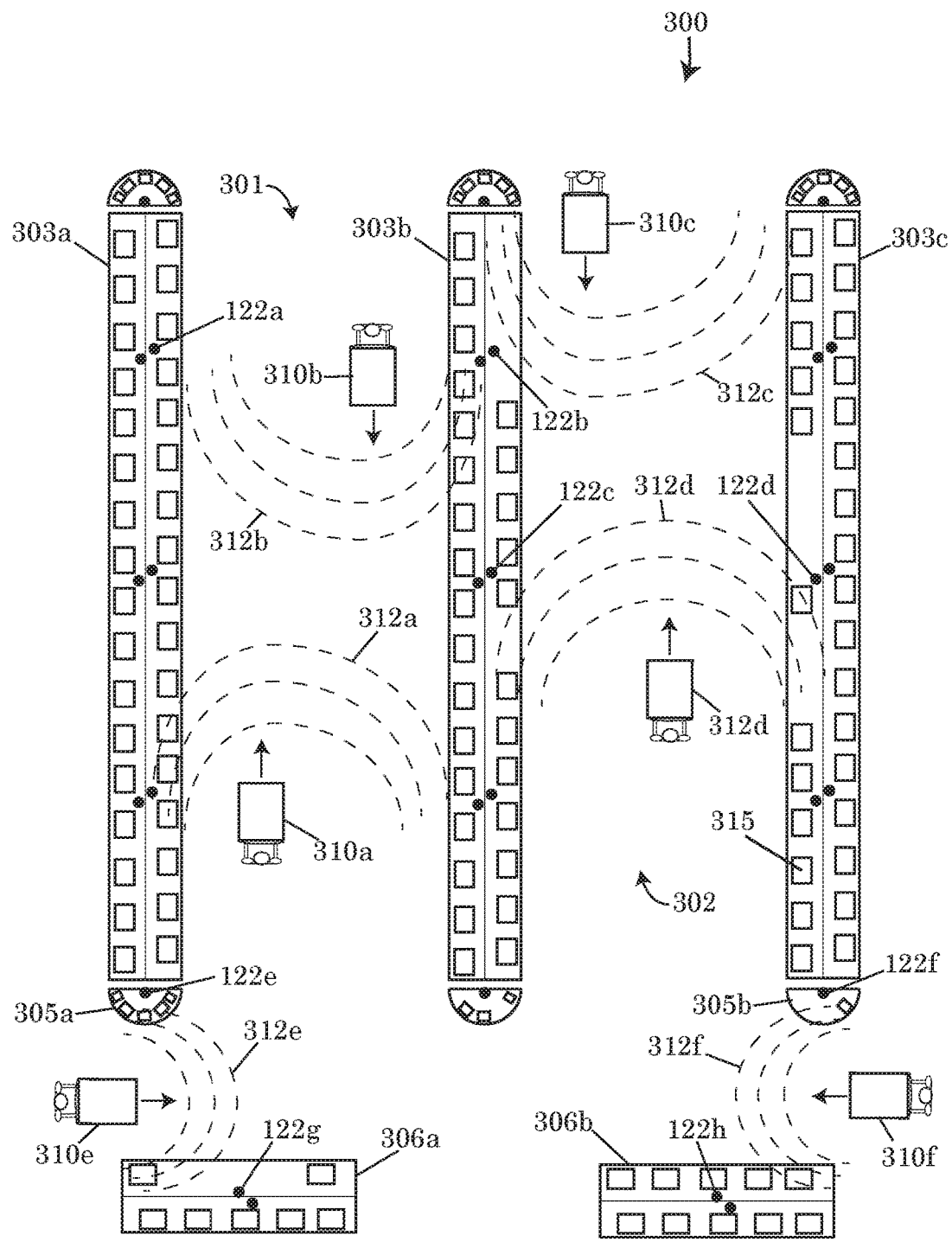
FIG. 3 depicts an illustration of an overhead view of an embodiment of a system for tracking merchandise.

Referring to the drawings, the overhead view of FIG. 3 describes one embodiment for implementing the system 100, 200 in a store or retail environment. Stores and retail environments may be generally arranged to include a plurality of aisles 301, 302 formed by a one or more shelving units 303a, 303b, 303c (hereinafter "shelves" 303) on either side of the aisles 301, 302. In addition to shelves 303 forming the aisles 301, 302, some store environments may also choose to display merchandise 315 on end caps 305a, 305b (hereinafter "end caps 305") positioned at the ends of each of the shelves 303, as well as standalone displays 306a, 306b (hereinafter "displays 306") which may be positioned within the center of the aisles 303 or perpendicular thereto.

As shown in the embodiment 300, sensor devices 122 may positioned at one or more locations within a store or environment. The plurality of sensors 122 monitoring the merchandise 315 may be positioned at multiple locations on each of the shelves 303, end caps 305 and displays 306. As each of the customers 310a, 310b, 310c, 310e, 310f (hereinafter "customers 310") or employees travel through the stores, the customers 310 (or employees), as well as the carts the customer 310 may be traveling with, may generate a displacement of air 312a, 312b, 312c, 312e, 312f (hereinafter "air displacement 312") associated with the movement of the customer 310, employee or cart. Embodiments of the sensor devices 122, which may include air displacement sensors, may measure the amount of air displacement 312 occurring as a result of the customer's movement.

Each sensor device 122, placed throughout the store may measure the air displacement 312 and/or the changes in air displacement 312 of the nearby or surrounding area of the sensor device. Embodiments of the air displacement 312 measurements or changes in air displacement may be recorded by the sensor devices 122 as sensor data. Each of the sensor devices 122 may transmit the sensor data comprising the measurements of air displacement to the sensor module 107 of the inventory management system 103. The inventory management system 103 may analyze the sensor data and request employees to restock or refill an area of the store as a function of the air displacement measured by the sensor devices 122.

Figure 4:
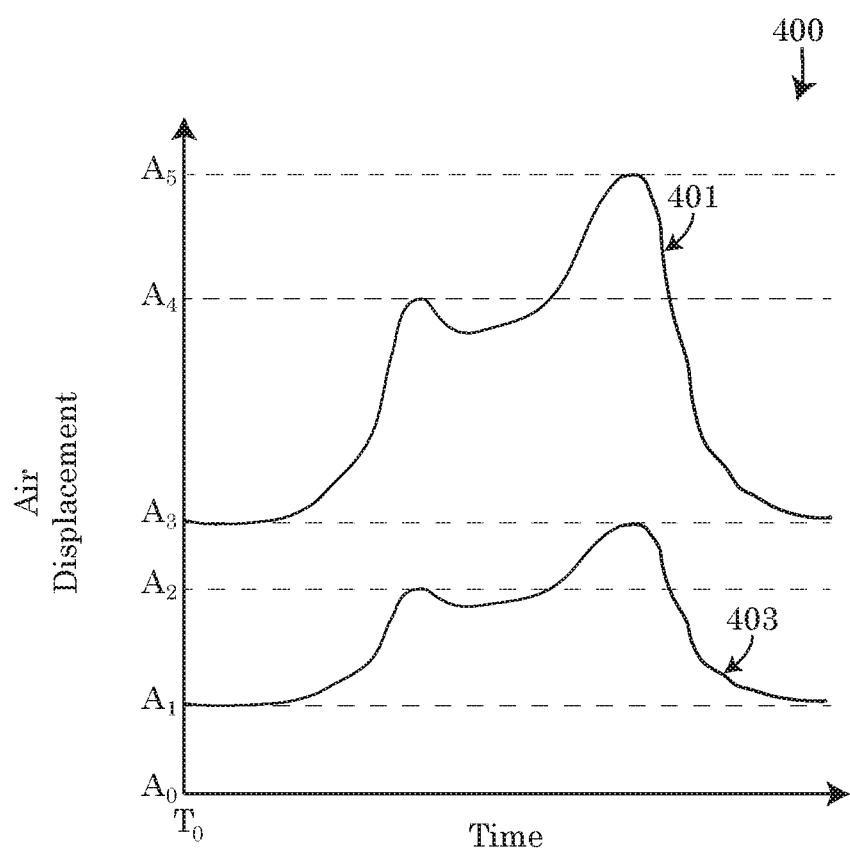
FIG. 4 depicts a graphical representation of air displacement in the presence and absence products.

As shown in embodiment 400 of FIG. 4, the air displacement 312 measured by the sensor devices 122 may vary as a function of the size and quantity of products within the proximity of the sensor device 122. As the amount of products surrounding the sensor device 122 increases, the measurement of air displacement may decrease. Part of this reason may be that a shelf 303, end cap 305 or display 306 that is full of merchandise may restrict or block the movement of air and decrease the overall amount of air displacement 312 measured by the sensor device. Likewise, an empty shelf may be less likely to impede or block the displacement of air and thus the sensor devices 122 may measure an overall higher level of air displacement as the customers 310 pass by the sensor device 122.

Alternatively, in some embodiments of the system 100, 200 the system may position a plurality of sensor devices 122 in each location of the retail environment. The redundancy of having multiple sensor devices 122 measure the air displacement 312 may allow for more accurate air displacement 312 measurements. For example, the sensor devices 122 may be positioned on opposite sides of the location being monitored and the air displacement may be measured multiple times and at multiple angles relative to the air movement as a customer moves through the store or retail environment. In such an embodiment, the sensor module 107 may receive multiple sensor data readings for each particular location being monitored by more than one sensor device 122. Embodiments of the inventory management system 103, including the sensor module 107, calibration module 109 and inference engine 111 may compare the air displacement 312 measurements from each of the plurality of sensor devices 122 positioned together in each location within the retail environment.

In the embodiment 400 shown in FIG. 4, the air displacement curves 403, 405 represent an air displacement measurement $A_n$ over a time length of time, T, recorded by a sensor device 122. As shown in FIG. 4, air displacement measurements may be compared and observed to determine the amount of merchandise that may be present while the air displacement measurement was taken. Air displacement curve 401 demonstrates air displacement measurements taken by a sensor device 122 during a period of time having a reduced amount of merchandise present in the proximity of device 122. Comparatively, curve 401 demonstrates a greater amount of air displacement at any particular moment in time and a greater amount of total area under the curve 401 than displacement curve 403. Likewise, air displacement curve 403 depicts a series of air displacement measurement wherein the amount of merchandise present in the proximity of the sensor device 122 was greater overall than the amount of merchandise present for the measurements taken for curve 401. Accordingly, due to the overall higher air displacement measured by the sensor devices 122 during the instance of plotting curve 401, it may be concluded that curve 401 demonstrates an instance in time wherein the amount of merchandise surrounding the sensor 122 was less than the amount of merchandise 315 that may have surrounded the sensor device 122 while the measurement for displacement curve 403 were collected.

In some embodiments of the inventory management system 103, the inventory tracking module 105 may comprise a calibration module 109. Embodiments of the calibration module may calibrate the sensor devices 122 to a baseline measurement of air displacement 312 experienced by the sensor devices 122 and further calibrate the sensor devices 122 by setting a maximum threshold for the air displacement that may be measured before a restocking request may be transmitted by the inventory management system 103. During calibration of the sensor devices 122, changes in air displacement 312 may be measured by the sensors 122 in a controlled manner, under pre-determined conditions. For example, air displacement 312 may be purposefully initiated while a set of shelves 303 are full of merchandise. Subsequently, the amount of products may be incrementally removed from the shelves 303 and the air displacement 312 may be subsequently measured again. The incremental removal of products and air displacement measurements may be continued. The inventory management system 103, and administrators thereof, may select an appropriate level of merchandise remaining on the shelf 303, end cap 305 or display 306 before an alert may be transmitted, based on the calibrated levels of air displacement 312 measured by the calibration performed by the calibration module 109. The level of merchandise 315 remaining or the amount of air displacement measured as a function of the amount of merchandise 315 remaining before a restocking request is transmitted, may be considered the maximum threshold.

For example, it may be determined by a particular store that restocking should occur when the amount of merchandise 315 remaining in the vicinity of the sensor device is approximately 75%, 50%, 25%, 10%, etc. The calibration module 109 may create a data model 112 of the amount of air displacement measured by the sensor devices 122 when the selected amount of merchandise 315 remaining on display in the store for each particular sensor device 122 calibrated by the calibration module 109. As customers move through the store and create a displacement of air 312, the sensor module 107 may collect the sensor data and an inference engine 111 may compare the collected sensor data with the data models 112 calibrated by the calibration module 109 for the selected maximum threshold. Accordingly, if based on the data models 112, it can be determined by the inference engine 111 that the amount of air displacement in the proximity of the sensor device 122 is consistent with the selected maximum threshold, as a function of comparing the data models 112 with the sensor data a restocking request may be made by the inventory management system 103.

Alternatively, in some embodiments, calibration of the maximum threshold may be performed on a shelf after a restocking request has been made. For example, a location that may be empty or have a low amount of inventory on the shelf 303, end cap 305 or display 306 may be identified by the inventory management system 103 or an employee manually monitoring the location. Upon making the restocking request the inventory management system 103 and/or the employee may read the each of the sensor devices 122 monitoring the location for the amount of air displacement measured under the low or empty conditions. The inventory management system 103 or the employee tasked with restocking the low or empty location may set the measurements of air displacement 312 observed in the sensor data as the baseline of the maximum threshold. Subsequently, if the shelves 303, end caps 305 or displays 306 reach a similar level of inventory levels and thus air displacement measurements, the restocking request may be automatically transmitted to one or more employees within the store or retail environment.

Embodiments of the inference engine 111 may be a processing program that derives a conclusion from the facts and rules contained in the knowledge base using various artificial intelligence techniques. In the system 100, 200 the inference engine 111 may draw conclusions as a function of comparing data models 112 of air displacement 312 measurements prepared during the calibration of the sensors 122 by the calibration module 109 with sensor data collected by the sensor devices 122 while the system 100,200 is actively monitoring the air displacement 312 resulting from the movement of customers, carts and employees within the store. Embodiments of the inference engine may analyze the data points of the data models 112 with real time sensor data being collected. As a function of the analysis of the similarities between data models and collected sensor data of air displacement 312, the inference engine may draw conclusions regarding the amount of merchandise 315 that may be presently available for sale and displayed within the proximity of a sensor device 122. Moreover, the inference engine 111 may further conclude whether or not the amount of merchandise 315 remaining on display is greater than a maximum threshold set by the store owner, employees, users or administrators of the inventory management system 103. The conclusions drawn by the inference engine 111 may be stored within a local repository 118 and/or a network accessible repository 125 in some embodiments of system 100, 200.

In some embodiments of the inventory tracking system 100, 200, the system 100, 200 may further comprise a video verification system 123 and a video verification module 113 which may be loaded in the memory device 115 of the inventory management system 103. Embodiments of the video verification system 123 may include one or more cameras or other video recording devices. The video verification system 123 may be deployed at numerous locations throughout the store or retail environment. Embodiments of the video verification system 123 may be utilized to confirm the product levels of merchandise 315 being displayed at a particular location of the store when a restocking request has been made. For example, the upon a determination by the inference engine 111 that a maximum threshold for remaining merchandise 315 being displayed as a function air displacement 312, the video verification module 113 may transmit a verification request to the video verification system 123. The verification request may include the location of the sensor device 122 reporting an unacceptable amount of merchandise 315 being displayed. Subsequently, the video verification system 123 may locate the location of the sensor device and record an image or video data. The video verification module 113 may receive the recorded image or video data. The recorded image or video data may, in some embodiments may be analyzed by the inference engine 111 or visually displayed on display device 121 for a user or administrator to confirm the presence or absence of sufficient merchandise 315 before dispatching an employee to restock the merchandise display.

In some embodiments, the inventory management system 103 may further include a reporting module 114. The reporting module 114 may be responsible for performing the task of generating and delivering reports or messages about the amounts of merchandise being displayed within a store or retail environment. The reports being generated may be displayed by a display device 121 connected to the inventory management system 103 or transmitted to one or more computer systems connected to a computer network 120 of the system 100, 200. In some embodiments, the reporting module 114 may be responsible for transmitting restocking requests to one or more employees of the store or retail environment. The reporting module 114 may transmit the requests in the form of an email, direct message, text message, alert, push notification or other type of messaging service. For example, in some embodiments, the reporting module 114 may transmit a restocking fee in the form of a messaging service to computer system or client device held in the possession of an employee. On receipt of the restocking request from the inventory tracking system 103, the request may be displayed on the recipient employee's computer system or client device indicating the location requesting the restocking of merchandise and the type of products that may need to be restocked.

In some embodiments of the system 100, 200 the reports generated and displayed by the reporting module 114 may further include statistics and inferences drawn by the inference engine 111. For example, the sensor data analyzed by the inference engine may provide some insight into the operation of the store or retail location. For instance, based on the sensor data collected by the sensor devices 122 the inference engine 111 may be able to determine the most popular sensor locations, the most popular products and the most heavily trafficked times of the store, each as a function of the number of restocking requests that may be made over the course of a selected time frame. Accordingly, the sensor data collected and the inferences drawn upon as a function of that data may be presented in a generated report, allowing for store owners, employees, administrators and users of the system to adjust the product displays and products being displayed in each location in order to increase recognition of products by customers or appropriately stock each section of the store accordingly.

Method for Tracking Merchandise

Figure 5:
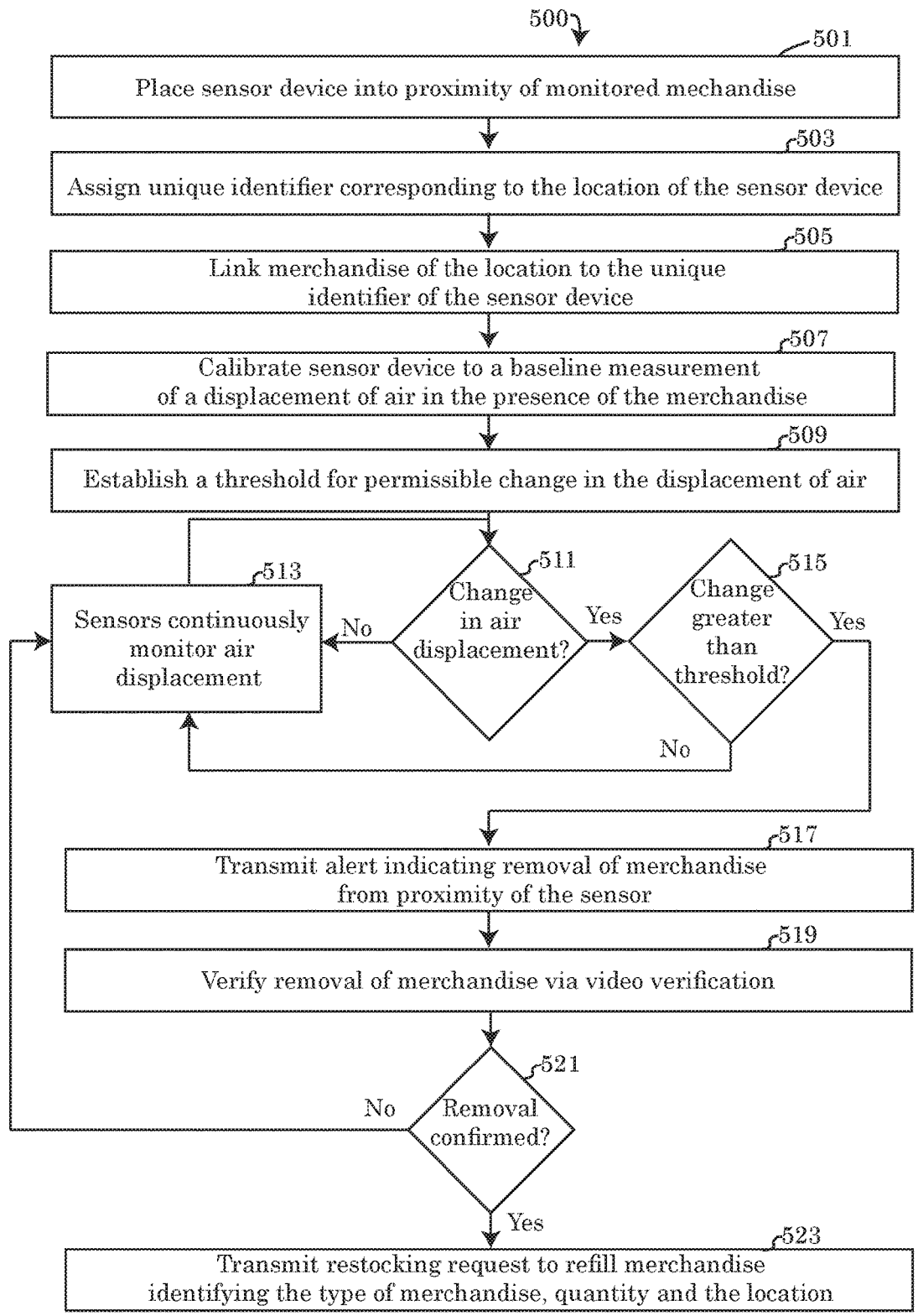
FIG. 5 depicts an embodiment of an algorithm for tracking merchandise.

The drawing of FIG. 5 represents an embodiment 500 of a method or algorithm that may be implemented for tracking merchandise in accordance with the systems described in FIGS. 1-4 using one or more computer systems defined generically in FIG. 6 below, and more specifically by the specific embodiments depicted in FIG. 1-4. A person skilled in the art should recognize that the steps of the algorithm described in FIG. 5 may not require all of the steps disclosed herein to be performed, not does the algorithm of FIG. 5 necessarily require that all the steps be performed in the particular order presented. Variations of the method steps presented in FIG. 5 may be performed, wherein one or more steps may be performed in a different order than presented by FIG. 5.

The algorithm 500 described in FIG. 5 may initiate in step 501 by placing a sensor device 122 into a proximity of merchandise 315 being monitored and tracked by the sensor device 122. In embodiments of the algorithm 500, a single sensor may be present for an entire store, thereby making any product displayed in the customer accessible areas of the store, "within the proximity" of the sensor device. Alternatively, in the exemplary embodiments, a plurality of sensors may be positioned throughout a store or other retail environment and positioned in distinct and discrete locations. The placement of the sensor devices may be any position relative to the merchandise being monitored. However, in the exemplary embodiments of the system, the sensor device may be positioned behind the merchandise being displayed.

In step 503, the inventory management system 103 may assign a unique identifier to each sensor device 122, allowing the inventory management system 103 to distinctly identify each of the sensor devices 122 from one another. The inventory management system 103 may further assign a particular location within the store and/or a specific set of products to the sensor. The location of each sensor may be determined based on the position of the sensor device within the layout of the store. For instance, the location of the sensor device 122 may be broadcasted to the inventory management system using a location system such as a GPS location system or by pinging the inventory management system using a beacon such as a Bluetooth or Bluetooth LE beacon.

In step 505 of the algorithm 500, the inventory management system 103 may link the merchandise 315 scheduled to be displayed at the assigned location of step 503 to each sensor device 122 responsible for tracking the merchandise 315. In some embodiments, the each sensor device may be linked to a particular type of merchandise using a passive or active RFID tag registered to the sensor device 122. In alternative embodiments, bar codes, UPCs, QR codes or other types of data-containing codes printed on the labels of products may be used to link the particular type of products to the sensor device 122 and/or register the products assigned to the sensor device 122 with the inventory management system. For example, a scanner system electronically linked to the sensor device 122 or the inventory management system may be used to scan the bar codes, UPCs or QR codes of products in order to register the product with the sensor device and the inventory management system 103. Upon scanning the code, the inventory management system 103 may create or update a database entry identifying the particular product associated with the sensor device 122. The inventory management system 103 may query the scanned bar code from a list of known bar codes to identify the specific product that is being linked.

In step 507, the calibration module 109 may calibrate each of the sensor devices 122 to a baseline measurement for the displacement of air in the presence of the merchandise within the proximity of the sensor device 122. The baseline measurement may calculated and applied as a function of the amount of air displacement 312 that may be measured in the presence of a full or nearly full inventory of merchandise within the proximity of the sensor device 122 measuring the displacement of air. While the merchandise being displayed is present in approximately maximum capacity on the shelves 303, end caps 305 or standalone displays 306, the amount of air displacement 312 experienced and measured may be the lowest. Subsequently, in step 509, the calibration module 109 may establish a maximum threshold for the amount of change in the displacement of air that may be permissible before a restocking request is transmitted to re-supply the merchandise display in order to bring the displacement of air back to the baseline measurement. Calibration of the sensor device 122 to establish the maximum threshold may be performed by establishing the baseline measurement in step 507 and systematically removing merchandise from the proximity of the sensor device until a selected amount of remaining product available is desired before restocking should occur. The sensor device 122 may measure the amount of air displacement occurring under the selected conditions having the minimally acceptable amount of merchandise. Accordingly, the change in the displacement of air from the fully stocked measurement establishing the baseline and the minimal amount of product desired, may be saved as a maximum threshold.

After calibrating and setting the baseline measurement for the displacement of air 312 and the maximum threshold for the displacement of air, the system 100, 200 may be placed in a live mode, wherein the sensor devices may begin actively measuring the changes in air displacement caused by individuals such as clients, employees and objects within the store. As each sensor device 122 measures changes in air displacement, the algorithm, in step 511 the sensor module 107 receiving the sensor data may determine whether or not a change in air displacement has occurred as a function of the change in the collected sensor data. If the sensor data does not indicate a change in the air displacement 312 from the baseline measurement of air displacement 312, the algorithm may proceed to step 513, whereby the sensor devices 122 may continuously monitor the displacement of air.

Conversely, in step 511, if a change in the air displacement 312 is measured by the sensor devices 122, the algorithm may proceed to perform a second determination in step 515 to further determine if the change in the displacement of air 312 is greater than the maximum threshold established in step 509. If, the change in the displacement of air is not greater than the threshold, it can be determined by the inventory management system 103 that a sufficient amount of merchandise is still present in the proximity of the sensor device 122 and thus the shelves, end caps and displays are adequately stocked. Under such circumstances, the algorithm 500 may proceed back to step 513 and continuously monitor the displacement of air 312.

However, if in step 515, the measurement of the displacement of air is greater than the established threshold measurement, the algorithm 500 may proceed to step 517. In step 517, in response to measurement of the displacement of air that is greater than the threshold, an alert may be transmitted by the inventory management system indicating an excess amount of merchandise has been removed from the proximity of the sensor device 122. The alert transmitted in step 517 may be reported and displayed by the inventory management system 103 on a display device 121 and/or transmitted to a video verification system 123 in some embodiments.

In step 519 of the embodiment of the algorithm 500, the video verification system 123 may verify whether or not merchandise has been removed from the proximity of the sensor device and further determine whether or not a sufficient amount of merchandise has been removed to warrant a request to replace the merchandise. The verification of remaining merchandise 315 at the location of the sensor device 122 may, in some embodiments be manually verified by an employee, either in person or upon viewing video data recorded by the video verification system 123 at the location of the sensor device. Alternatively, in some embodiments, the video verification system 123 may be equipped with a camera and object recognition software. The video verification system may record the video data of the specified location of the store comprising the sensor device 122. The video data may be transmitted to the video verification module 113, whereby the video verification may implement one or more object recognition algorithms to determine the amount of remaining products in the vicinity of the sensor device. In some alternative embodiments, a video verification system may not be present. Accordingly, in a system lacking a video verification system 123, the verification of the removal of merchandise 315 may not be applicable to some embodiments of the system implementing the described tracking method 500.

In step 521, a determination may be made by the system 100, 200 whether or not the removal of the merchandise beyond the maximum threshold has been confirmed by the verification performed in step 519. If, the removal of the of the merchandise is not shown to have occurred, or has not occurred at a level of removal consistent with the maximum threshold established in step 509, the algorithm may return to step 513 and continuously monitor air displacement. Likewise, in an embodiment of the algorithm being performed using a system that may lack a video verification system 123, or if the removal has been confirmed by video verification, the algorithm may proceed to step 523. In step 523, the inventory management system 103 and more specifically, the reporting module 114, may transmit a restocking request to one or more employees of the store or retail environment. The nature of the request may include a variety of restocking information including, but not limited to the type of merchandise to be restocked, an approximate (or exact) quantity and/or the location of the sensor device 122 for the restocking to occur.

Computer System

Figure 6:
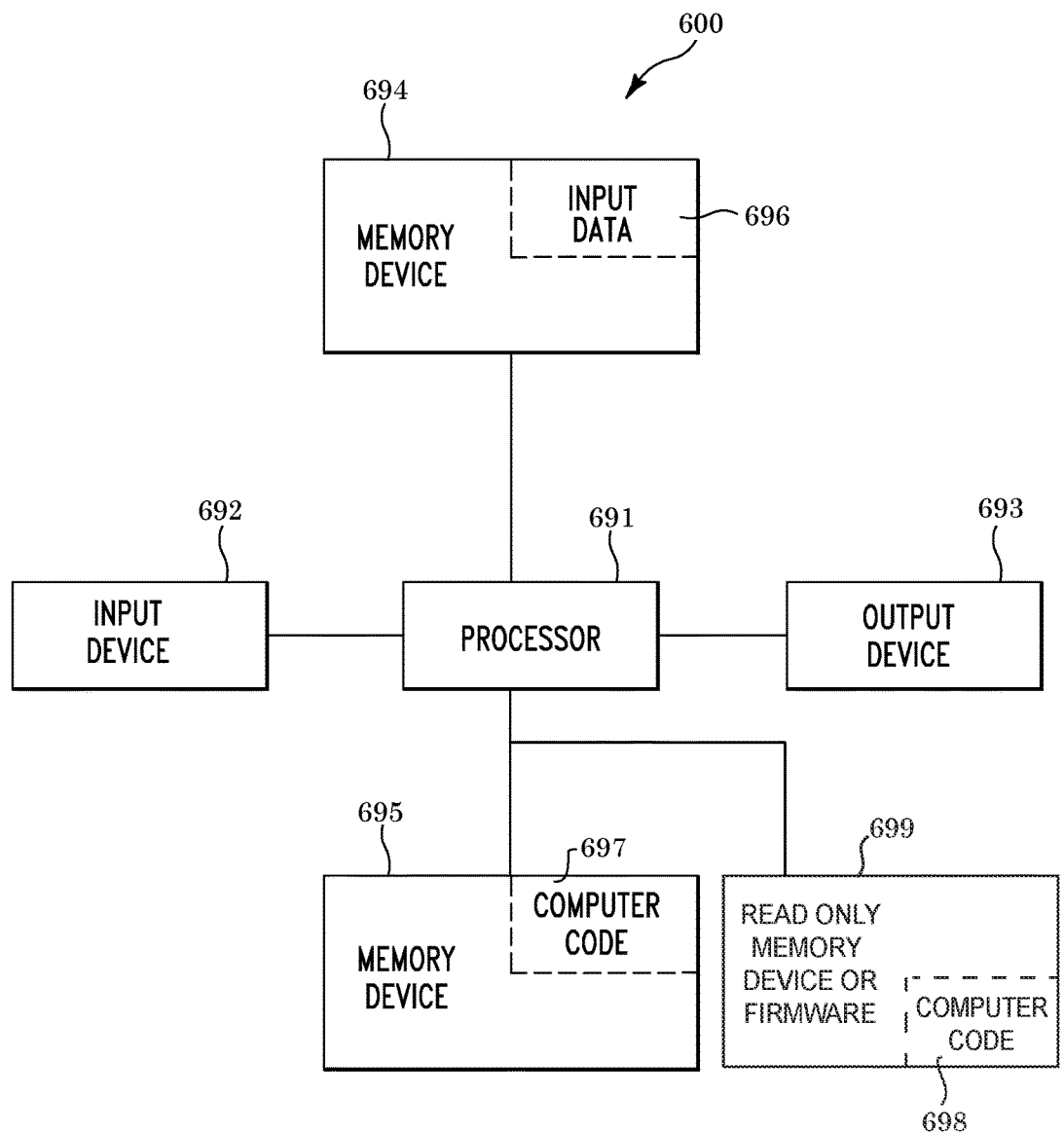
FIG. 6 depicts an embodiment of a computer system implementing a method for tracking merchandise, consistent with the embodiments disclosed in this application.

Referring to the drawings, FIG. 6 illustrates a block diagram of a computer system 600 that may be included in the systems of FIGS. 1-3 and for implementing methods for tracking merchandise as shown in the embodiment of FIG. 5 and in accordance with the embodiments described in the present disclosure. The computer system 600 may generally comprise a processor 691, otherwise referred to as a central processing unit (CPU), an input device 692 coupled to the processor 691, an output device 693 coupled to the processor 691, and memory devices 694 and 695 each coupled to the processor 691. The input device 692, output device 693 and memory devices 694, 695 may each be coupled to the processor 691 via a bus. Processor 691 may perform computations and control the functions of computer 600, including executing instructions included in the computer code 697 for tools and programs for tracking merchandise, in the manner prescribed by the embodiments of the disclosure using the systems of FIGS. 1-4 wherein the instructions of the computer code 697 may be executed by processor 691 via memory device 695. The computer code 697 may include software or program instructions that may implement one or more algorithms for implementing the methods for tracking merchandise, as described in detail above. The processor 691 executes the computer code 697. Processor 691 may include a single processing unit, or may be distributed across one or more processing units in one or more locations (e.g., on a client and server).

The memory device 694 may include input data 696. The input data 696 includes any inputs required by the computer code 697, 698. The output device 693 displays output from the computer code 697, 698. Either or both memory devices 694 and 695 may be used as a computer usable storage medium (or program storage device) having a computer readable program embodied therein and/or having other data stored therein, wherein the computer readable program comprises the computer code 697, 698. Generally, a computer program product (or, alternatively, an article of manufacture) of the computer system 600 may comprise said computer usable storage medium (or said program storage device).

Memory devices 694, 695 include any known computer readable storage medium, including those described in detail below. In one embodiment, cache memory elements of memory devices 694, 695 may provide temporary storage of at least some program code (e.g., computer code 697, 698) in order to reduce the number of times code must be retrieved from bulk storage while instructions of the computer code 697, 698 are executed. Moreover, similar to processor 691, memory devices 694, 695 may reside at a single physical location, including one or more types of data storage, or be distributed across a plurality of physical systems in various forms. Further, memory devices 694, 695 can include data distributed across, for example, a local area network (LAN) or a wide area network (WAN). Further, memory devices 694, 695 may include an operating system (not shown) and may include other systems not shown in the figures.

In some embodiments, rather than being stored and accessed from a hard drive, optical disc or other writeable, rewriteable, or removable hardware memory device 694, 695, stored computer program code 698 (e.g., including algorithms) may be stored on a static, non-removable, read-only storage medium such as a Read-Only Memory (ROM) device 699, or may be accessed by processor 691 directly from such a static, non-removable, read-only medium 699. Similarly, in some embodiments, stored computer program code 697 may be stored as computer-readable firmware 699, or may be accessed by processor 691 directly from such firmware 699, rather than from a more dynamic or removable hardware data-storage device 695, such as a hard drive or optical disc.

In some embodiments, the computer system 600 may further be coupled to an Input/output (I/O) interface and a computer data storage unit (for example a data store, data mart or repository). An I/O interface may include any system for exchanging information to or from an input device 692 or output device 693. The input device 692 may be, inter alia, a keyboard, a mouse, sensors, beacons, RFID tags, microphones, biometric input device, camera, timer, etc. The output device 693 may be, inter alia, a printer, a plotter, a display device (such as a computer screen or monitor), a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 600, and may include any type of transmission link, including electrical, optical, wireless, etc.

The I/O interface may allow computer system 600 to store information (e.g., data or program instructions such as program code 697, 698) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to tracking merchandise. Thus, an embodiment of the present invention discloses a process for supporting computer infrastructure, where the process includes providing at least one support service for at least one of integrating, hosting, maintaining and deploying computer-readable code (e.g., program code 697, 698) in a computer system (e.g., computer 600) including one or more processor(s) 691, wherein the processor(s) carry out instructions contained in the computer code 697 causing the computer system to track out of stock merchandise. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for tracking merchandise. Thus the present invention discloses a process for supporting, deploying and/or integrating computer infrastructure, integrating, hosting, maintaining, and deploying computer-readable code into the computer system 600, wherein the code in combination with the computer system 600 is capable of performing a method of tracking merchandise.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for tracking merchandise comprising the steps of:
   placing a sensor device into a proximity near merchandise being displayed, the sensor device including an air displacement sensor device;
   calibrating the sensor device to a baseline measurement of a displacement of air in the presence of the merchandise, comprising:
      measuring, by the sensor device, a first change in air displacement proximal a location where the merchandise is displayed;
      incrementally removing a first portion of the merchandise so that a second portion of the merchandise remains at the location; and
      measuring, by the sensor device, a second change in air displacement proximal the location;
   establishing, by the sensor device in response to the first and second changes in air displacement, a threshold for a permissible change in the baseline measurement of the displacement of air;
   detecting, by the sensor device, the change in the displacement of air that is greater than the threshold, wherein the change in the displacement of air occurs as a function of a removal of the merchandise from the proximity of the sensor device; and
   transmitting, by the sensor device, an alert indicating a removal of the merchandise from the proximity of the sensor device.

2. The method of claim 1, further comprising the steps of:
   assigning to the sensor device, a unique identifier corresponding to a location of the sensor device within a store;
   linking the merchandise to the unique identifier of the sensor device; and
   transmitting a restocking request to refill the merchandise at a location in proximity to the sensor device in response to the alert indicating the removal of the merchandise.

3. The method of claim 2, wherein the restocking request describes a type of merchandise, quantity of merchandise, an amount of merchandise and the location to bring the merchandise for fulfilling the restocking request.

4. The method of claim 1, further comprising the step of:
   linking a bar code of the merchandise to the sensor device;
   verifying the alert indicating the removal of the merchandise with a record of merchandise purchases tracking the bar code.

5. The method of claim 4, further comprising the step of:
   tracking, by the sensor device, a total amount of merchandise removed from the proximity of the sensor device; and
   reporting, a total amount of merchandise purchased as a function of the total amount of merchandise purchased and the record of merchandise purchases.

6. The method of claim 1, further comprising the step of:
   positioning the sensor device behind a display of the merchandise, wherein the display is located within an aisle of a store.

7. The method of claim 6, wherein the displacement of air measured by the sensor device is a function of a movement of customers or employees in the aisle of the store.

8. The method of claim 6, wherein the display of merchandise is positioned on a shelf containing comprising the merchandise.

9. The method of claim 8, further comprising the step of:
   linking the sensor device to a network of sensor devices, wherein each of the sensor devices in the network of sensor devices is positioned on each shelf of the display and each of the sensor devices independently monitor a separate group of merchandise.

10. The method of claim 1, wherein the threshold established by the sensor device is calibrated to transmit the alert upon a reduction of merchandise less than or equal to half a total amount of merchandise monitored by the sensor device.

11. A computer system comprising:
    a processor;
    a memory device coupled to the processor;
    a sensor device coupled to the processor; and
    a computer readable storage device coupled to the processor, wherein the computer readable storage device contains program code executable by the processor via the memory device to implement a method for tracking merchandise comprising the steps of:
       placing the sensor device into a proximity near merchandise being displayed;

calibrating the sensor device to a baseline measurement of a displacement of air in the presence of the merchandise, comprising:
  measuring, by the sensor device, a first change in air displacement proximal a location where the merchandise is displayed;
  incrementally removing a first portion of the merchandise so that a second portion of the merchandise remains at the location; and
  measuring, by the sensor device, a second change in air displacement proximal the location;
establishing, by the sensor device in response to the first and second changes in air displacement, a threshold for a permissible change in the baseline measurement of the displacement of air;
detecting, by the sensor device, the change in the displacement of air that is greater than the threshold, wherein the change in the displacement of air occurs as a function of a removal of the merchandise from the proximity of the sensor device; and
transmitting, by the sensor device, an alert indicating a removal of the merchandise from the proximity of the sensor device.

12. The computer system of claim 11, further comprising:
assigning, by the processor, a unique identifier to the sensor device, corresponding to a location of the sensor device within a store;
linking, by the processor, the merchandise to the unique identifier of the sensor device; and
transmitting, by the processor, a restocking request to refill the merchandise at a location in proximity to the sensor device in response to the alert indicating the removal of the merchandise.

13. The computer system of claim 12, wherein the restocking request describes a type of merchandise, quantity of merchandise, an amount of merchandise and the location to bring the merchandise for fulfilling the restocking request.

14. The computer system of claim 11, further comprising:
linking, by the processor, a bar code of the merchandise to the sensor device;
verifying, by the processor, the alert indicating the removal of the merchandise with a record of merchandise purchases tracking the bar code.

15. The computer system of claim 14, further comprising:
tracking, by the processor, a total amount of merchandise removed from the proximity of the sensor device; and
reporting, by the processor, a total amount of merchandise purchased as a function of the total amount of merchandise purchased and the record of merchandise purchases.

16. The computer system of claim 11, wherein, the sensor device is positioned behind a display of the merchandise, wherein the display is located within an aisle of a store.

17. The computer system of claim 16, wherein the displacement of air measured by the sensor device is a function of a movement of customers or employees in the aisle of the store.

18. The computer system of claim 16, wherein the display of the merchandise is positioned on a shelf containing comprising the merchandise.

19. The computer system of claim 18, wherein the sensor device is linked to a network of sensor devices, wherein each of the sensor devices in the network of sensor devices is positioned on each shelf of the display and each of the sensor devices independently monitor a separate group of merchandise.

20. The computer system of claim 11, wherein the threshold established by the sensor device is calibrated to transmit the alert upon a reduction of merchandise less than or equal to half a total amount of merchandise monitored by the sensor device.

* * * * *